United States Patent [19]

Katayama

[11] Patent Number: 5,411,452
[45] Date of Patent: May 2, 1995

[54] RUNNING CONTROL APPARATUS FOR MOTOR VEHICLE

[75] Inventor: Kazuyori Katayama, Himeji, Japan

[73] Assignee: Mitsubishi Denki Kabushiki Kaisha, Tokyo, Japan

[21] Appl. No.: 111,574

[22] Filed: Aug. 25, 1993

[30] Foreign Application Priority Data

Aug. 27, 1992 [JP] Japan .................................. 4-228466

[51] Int. Cl.6 .................... F02D 9/06; B60K 41/20
[52] U.S. Cl. ............................... 477/206; 123/360; 303/104; 477/171; 477/183
[58] Field of Search ............... 477/206, 207, 203, 171, 477/183; 123/360, 376, 377; 303/104, 110

[56] References Cited

U.S. PATENT DOCUMENTS

| | | | |
|---|---|---|---|
| 3,331,477 | 7/1967 | Trifiletti et al. | 477/206 |
| 3,331,478 | 7/1967 | Trifiletti et al. | 477/207 |
| 3,495,692 | 2/1970 | Holgate | 477/207 |
| 4,286,685 | 9/1981 | Rudolph et al. | 123/360 X |
| 4,445,603 | 5/1984 | Filsinger | 477/183 X |
| 4,750,598 | 6/1988 | Danno et al. | 477/183 X |
| 4,768,483 | 9/1988 | Asayama | . |
| 4,850,250 | 7/1989 | Nehmer et al. | 477/206 X |
| 4,873,957 | 10/1989 | Ueyama et al. | . |
| 4,892,071 | 1/1990 | Asayama | . |
| 4,934,476 | 6/1990 | Hyodo | 123/360 X |
| 5,046,575 | 9/1991 | Asayama | . |
| 5,113,822 | 5/1992 | Asayama | . |

Primary Examiner—Andrea L. Pitts
Attorney, Agent, or Firm—Sughrue, Mion, Zinn, Macpeak & Seas

[57] ABSTRACT

A running control apparatus for an automobile prevents an abnormal running state by depressing a brake pedal even when a fault takes place in the component(s) of the control apparatus. When a detected brake pedal depression stroke exceeds a predetermined value, an electric power supply to a throttle actuator is interrupted to thereby allow a throttle valve to assume a fully closed position.

11 Claims, 6 Drawing Sheets

RUNNING CONTROL APPARATUS FOR MOTOR VEHICLE

BACKGROUND OF INVENTION

1. Field of the Invention

The present invention relates generally to a running control of an automobile or motor vehicle and more particularly to an apparatus for controlling the running of a motor vehicle by controlling a throttle valve of an internal combustion engine with an electric signal generated in response to actuation of an accelerator pedal.

2. Description of the Related Art

The intake air flow fed to a gasoline engine of a motor vehicle is conventionally regulated by a throttle valve whose opening is controlled by means of an accelerator pedal mechanically interlocked with the throttle valve. In recent years, however, there has been developed and adopted in some practical applications a so-called drive-by-wire system in which the opening of the throttle valve is controlled by an electrical throttle actuator in response to an output signal of an accelerator pedal position sensor which signal represents depth or stroke of depression of an accelerator pedal of the motor vehicle, with a view to enhancing the comfortableness in driving the motor vehicle and realizing a driving at a cruising speed.

For a better understanding of the present invention, the background technique thereof will be described in some detail.

Figure 6:
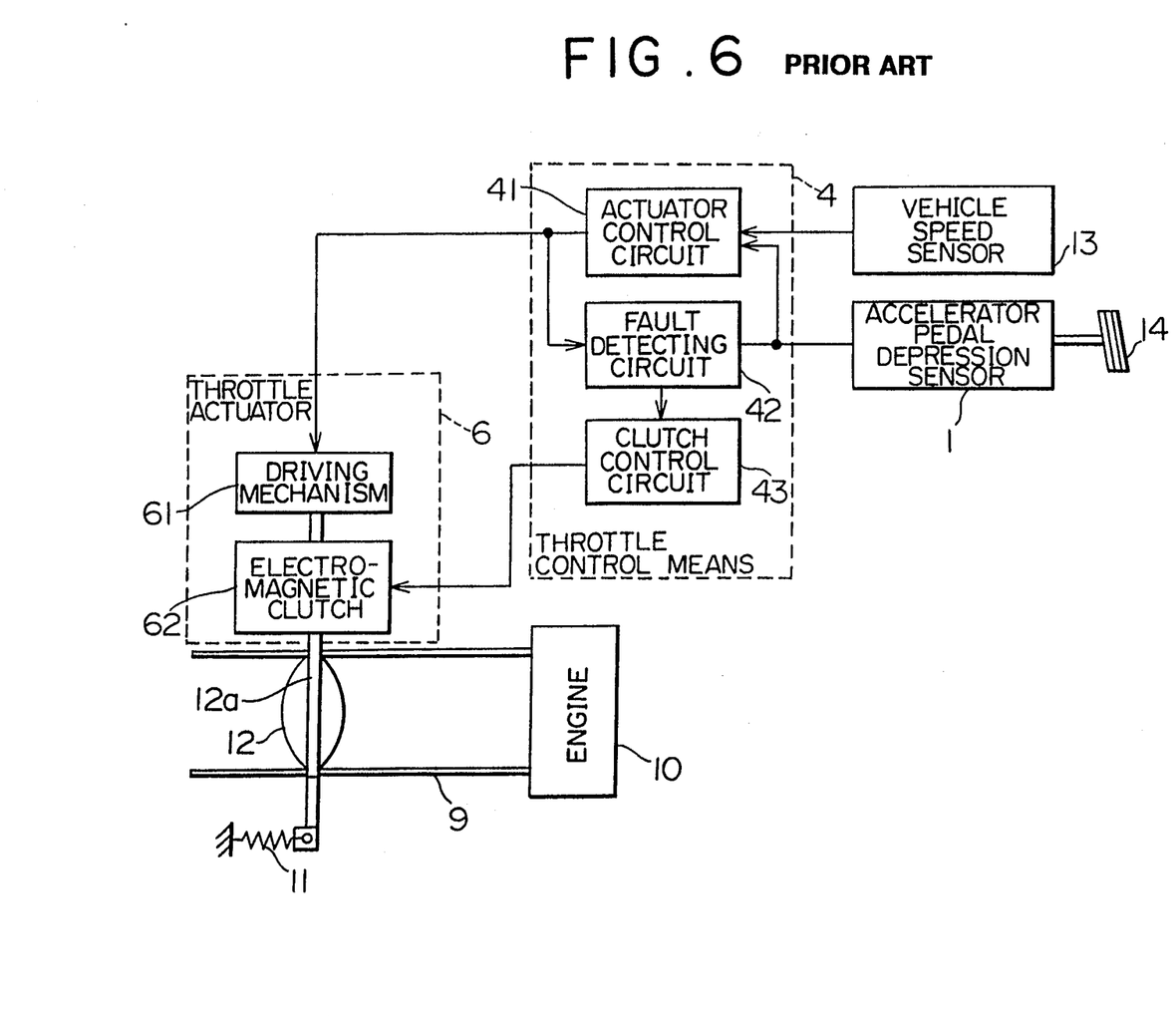
FIG. 6 is a block diagram showing a structure of a running control apparatus for a motor vehicle known heretofore.

FIG. 6 shows generally and schematically a structure of a motor vehicle running control apparatus disclosed in Japanese Unexamined Patent Application Publications Nos. 1687/1968 and 76236/1982 (JP-A-43-1687 and JP-A-57-76236). Referring to the figure, an internal combustion engine (hereinafter also referred to as the engine) denoted by a reference numeral 10 is equipped with an intake pipe 9 in which a throttle valve 12 is installed for controlling or adjusting the amount of air supplied to the engine 10. The throttle valve 12 is provided with a return spring 11 for allowing the throttle valve 12 to assume a fully closed position, when it is released. An electromagnetic clutch 62 has an output shaft coupled to a rotatable shaft 12a of the throttle valve 12 and an input shaft coupled to a driving mechanism 61. The electromagnetic clutch 62 and the driving mechanism 61 cooperate to constitute a throttle actuator 6 adapted to be controlled by a control unit 4 which includes an actuator control circuit 41, a fault detection circuit 42 and a clutch control circuit 43. An accelerator pedal depression depth or stroke sensor 1 is provided, being interlocked to an accelerator pedal 14 for generating a voltage signal proportional to the depth of depression (stroke of actuation) of the accelerator pedal 14. The voltage signal outputted from the sensor 1 is inputted to the control unit 4. Further, a vehicle speed sensor 13 is provided for detecting the speed of the motor vehicle, wherein the output signal of this sensor 13 is also inputted to the control unit 4.

The driving mechanism 61 of the throttle actuator 6 is usually constituted by a DC motor, a stepping motor or the like. The electromagnetic clutch 62 is of a friction disk type. The relation between the depression of the accelerator pedal 14 and the opening degree of the throttle valve 12 is controlled by the actuator control circuit 41 in accordance with a predetermined function so as to ensure a comfortable driving of the motor vehicle.

Further, the throttle valve 12 is controlled by the throttle actuator 6 in response to the output signal of the actuator control circuit 41 so that the detected vehicle speed coincides with a desired or target vehicle speed commanded by the driver.

By controlling the opening degree of the throttle valve 12 in accordance with a predetermined function or through a vehicle-speed feedback loop by using the throttle actuator 6 without coupling directly the throttle valve to the accelerator pedal, there can be assured a high freedom in the running control of the motor vehicle as well as a high drivability thereof.

With the arrangement of the conventional control apparatus described above, an abnormal running state of the motor vehicle which may take place upon the occurrence of failure or fault in the accelerator pedal depression sensor 1 or the throttle actuator 6 is prevented by providing the fault detecting circuit 42 which responds to the detection of a the fault by interrupting the electric power supply to the electromagnetic clutch 62 through the clutch control circuit 43 and deenergising the clutch 62 for thereby releasing the throttle valve 12 from the driving mechanism 61 of the throttle actuator 6 to allow the throttle valve 12 to be fully closed under the influence of the return spring 11.

However, in practical applications, difficulty is encountered to perform the fault detection in a perfectly satisfactory manner. In particular, when a fault occurs simultaneously in both the accelerator pedal depression sensor 1 and the clutch control circuit 43, the engine speed may increase uncontrollably, because the throttle valve 12 can no more be fully closed in that case and because the braking as applied is not effective when the throttle valve 12 is opened.

SUMMARY OF THE INVENTION

In the light of the state of the art described above, it is an object of the present invention to provide a running control apparatus for a motor vehicle which can prevent the occurrence of abnormal running of the motor vehicle even when a fault takes place in the circuit(s) incorporated in the control apparatus, to thereby ensure a high safety for the motor vehicle.

In view of the above and other objects which will become apparent as description proceeds, there is provided according to an aspect of the invention a running control apparatus for a motor vehicle driven by an internal combustion engine, which apparatus comprises an accelerator pedal depression magnitude detecting means for detecting magnitude of depression of an accelerator pedal, a brake pedal depression magnitude detecting means for detecting magnitude of depression of a brake pedal, a throttle control means for driving a throttle valve actuator by calculating a control quantity for controlling a throttle valve on the basis of an accelerator pedal depression signal supplied from the accelerator pedal depression magnitude detecting means, and a power supply interrupting means for interrupting an electric power supply to the throttle actuator when the magnitude of depression of the brake pedal detected by the brake depression magnitude detecting means exceeds a predetermined value, to thereby allow the throttle valve to assume a fully closed state.

With the arrangement of the running control apparatus according to the invention described above, the power supply to the throttle actuator is interrupted when the magnitude of the braking force applied by the driver exceeds a predetermined value, whereby the throttle valve is forced to assume the fully closed position. Thus, even when a fault occurs in the component(s) of the running control apparatus, the motor vehicle can be protected against the abnormal running such as overrunning by applying the brake.

The invention will become more readily apparent from the following description of preferred embodiments thereof shown, by way of example, in the drawings.

DESCRIPTION OF THE PREFERRED EMBODIMENTS

Now, the invention will be described in detail in conjunction with preferred or exemplary embodiments thereof by reference to the drawings.

Embodiment 1

Figure 1:
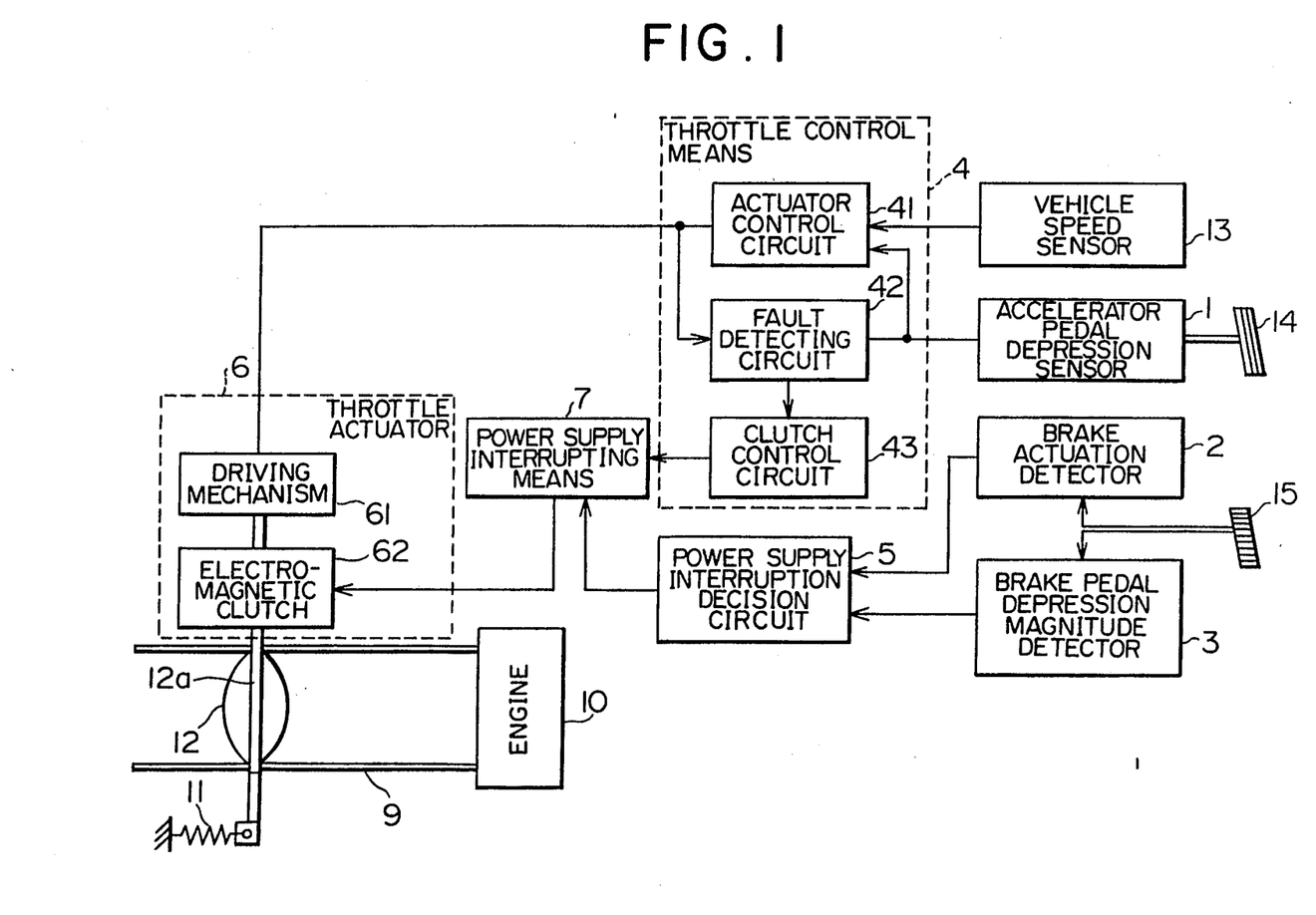
FIG. 1 is a block diagram showing a general arrangement of a running control apparatus for a motor vehicle according to an embodiment of the present invention.

FIG. 1 shows generally a structure of the running control apparatus for a motor vehicle according to a first embodiment of the invention. In the figure, same components as those of the hitherto known control apparatus described with reference to FIG. 6 are denoted by like reference numerals and repeated description thereof is omitted. In this embodiment, there is provided a brake pedal actuation detecting means 2 which operates upon actuation of a brake pedal 15 and which is constituted by a switch circuit driven by means of the brake pedal 15. Provided in association with the brake actuation detecting means 2 is a brake pedal depression magnitude detecting means 3 which serves to detect magnitude of depression (depth of depression) of the brake pedal 15 and which is constituted by a potentiometer for generating a voltage signal of an amplitude proportional to the magnitude (stroke) of depression of the brake pedal 15. The output signals of the brake actuation detecting means 2 and the brake pedal depression magnitude (stroke) detecting means 3 are inputted to a power supply interrupt decision means 5 which serves to make a decision on the basis of the signals inputted from the means 2 and 3 as to whether or not the power supply to the throttle actuator 6 is to be interrupted. The output of the power supply interrupt decision means 5 is supplied to a power supply interrupting means 7 which responds to the output signal of the clutch control circuit 43 and the output of the power supply interrupt decision means 5 to thereby interrupt the electric power supply to the throttle actuator 6, specifically the clutch 62 thereof.

Figure 2:
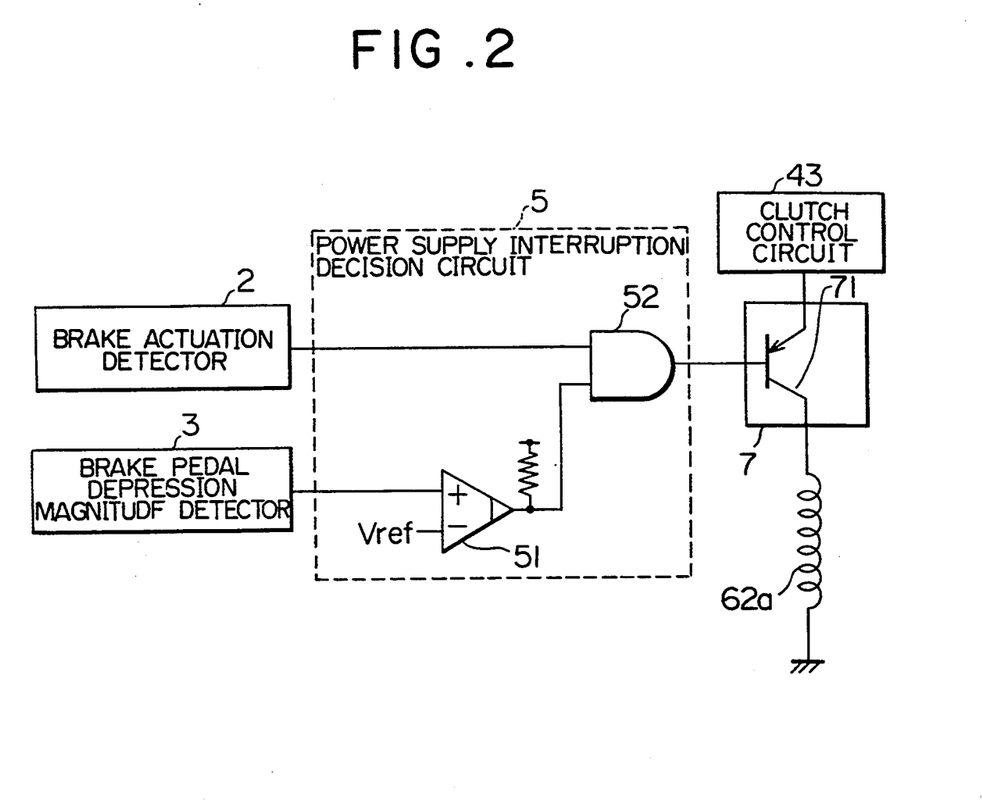
FIG. 2 is a schematic circuit diagram showing an exemplary configuration of a power supply interrupting circuit incorporated in the running control apparatus shown in FIG. 1.

FIG. 2 shows a circuit configuration of the power supply interrupt decision means 5. Referring to the figure, the output signal of the brake pedal depression magnitude (stroke) detecting means 3 is applied to a plus input terminal of a comparator 51 constituted by an operational amplifier having a minus input terminal to which a reference signal $V_{ref}$ indicative of a preset value is applied. The output signal of the comparator 51 is applied to one input terminal of an AND circuit 52 which has the other input terminal supplied with a brake actuation signal generated by the brake actuation detecting means 2. The output terminal of the AND circuit 52 is connected to a base electrode of a PNP-transistor 71 which constitutes the power supply interrupting means 7 and which has an emitter electrode connected to the output of the clutch control circuit 43 and a collector electrode connected to a coil 62a of the electromagnetic clutch 62 incorporated in the throttle actuator 6.

Description will now be made of operation of the running control apparatus of the structure described above. Ordinarily, there is provided in association with the brake pedal 15 a so-called stop lamp switch (constituting the brake actuation detecting means 2 of the illustrated embodiment) for detecting actuation or depression of the brake pedal 15 by the driver to thereby turn on a brake lamp. The stop lamp switch 2 is so designed as to be closed when the brake pedal is depressed only slightly by the driver, as is illustrated in a timing chart of FIG. 3, whereby a voltage of "H" level is generated. When the brake pedal is released, the stop lamp switch (i.e., the brake actuation detecting means) 2 is opened (OFF) to output a voltage signal of "L" level.

Figure 3:
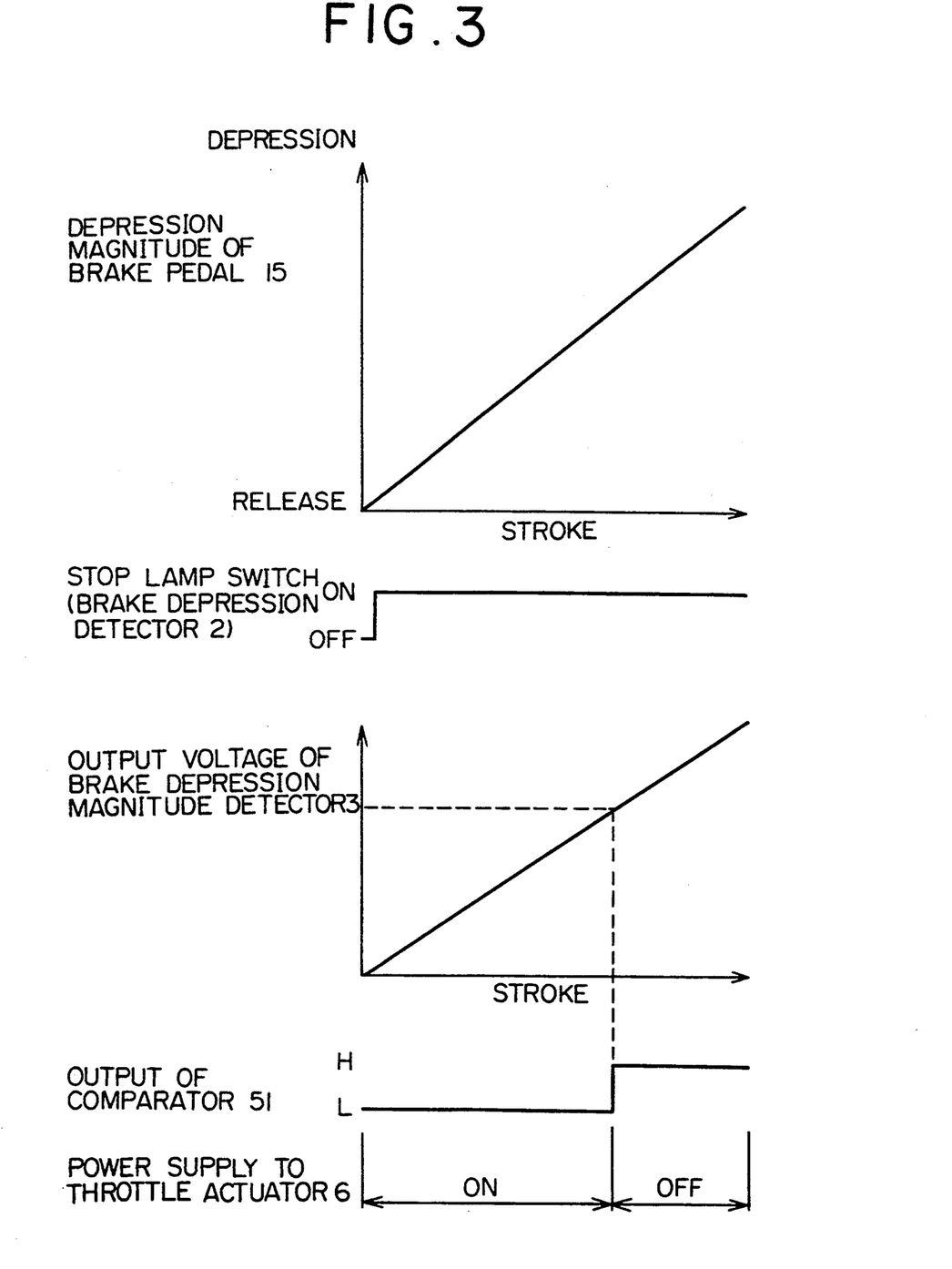
FIG. 3 is a timing chart for illustrating operations of several components of the running control apparatus.

On the other hand, the brake pedal depression magnitude (stroke) detecting means 3 is designed to generate a voltage signal which is in proportion to the depression stroke or depth of the brake pedal 15, as illustrated in FIG. 3. The output voltage of the brake pedal depression magnitude detecting means 3 and the reference value $V_{ref}$ are compared by the comparator 51, wherein when the output voltage of the brake pedal depression magnitude detecting means 3 is smaller than the reference voltage $V_{ref}$, a voltage of "L" level is outputted from the comparator 51 while when the output voltage of the brake depression stroke detecting means 3 is greater than the reference voltage $V_{ref}$, the comparator 51 outputs a voltage of "H" level.

The output signals of the brake actuation detecting means (stop lamp switch) 2 and the comparator 51 are logically ANDed by the AND circuit 52 in order to enhance the reliability of the decision made by the power supply interrupt decision means 5. In the following table 1, the output levels of the comparator 51 and the AND circuit 52 are listed together with the ON/OFF states of the stop lamp switch 2 and information given by the output levels of the AND circuit 52.

TABLE 1

| STOP LAMP SWITCH (BRAKE ACTUATION DETECTOR 2) | OUTPUT OF COMPARATOR 51 | OUTPUT OF AND CIRCUIT 52 | REMARKS |
| --- | --- | --- | --- |
| OFF (L) | L | L | BRAKE IS RELEASED |
| ON (H) | L | L | SHALLOW DEPRESSION |
| ON (H) | H | H | DEEP DEPRESSION |
| OFF (L) | H | L | ABNORMALITY SIGNAL |

In the above table 1, the signal levels listed at the bottom row indicate that the running control apparatus is in an abnormal state. If the power supply interrupting means 7 for the throttle actuator 6 should be operated by inadvertence in this state, there arises a possibility that the throttle valve 12 may remain constantly closed, making it impossible to drive the motor vehicle. Accordingly, measures are taken to inhibit the power supply interrupting means 7 for the throttle actuator 6 from being operated in this abnormal state, as in the case of the running control apparatus known heretofore.

When the driver depresses the brake pedal deeply, the power supply interrupt decision means 5 outputs a voltage signal of "H" level, as a result of which the transistor 7 constituting the power supply interrupting means 7 is turned off. Consequently, the coil 62a of the electromagnetic clutch 62 is electrically deenergized independent of the output of the clutch control circuit 43 of the throttle control means 4, whereby the electromagnetic clutch 62 is disconnected. Thus, the driving power of the driving mechanism 61 of the throttle actuator 6 is no more transmitted to the throttle valve 12, which is thus forced to assume the fully closed position under the spring force of the return spring 11.

On the other hand, the state in which the accelerator pedal 14 is released indicates that the driver wants to decelerate the motor vehicle. Accordingly, when the brake pedal 15 is depressed in this state, the electromagnetic clutch 62 may be disconnected through the operation described above to thereby allow the throttle valve 12 to assume the fully closed position. In this connection, it is however noted that when the motor vehicle is to be started on an uphill or snow-covered road, it is required to open the throttle valve 12 by depressing the accelerator pedal while simultaneously manipulating the braking system. Accordingly, the operation timing of the comparator 51 is so set that the operation of the power supply interrupting means 7 is made effective only when the brake pedal 15 is depressed deeply by the driver as in the case of emergency braking where the motor vehicle must be stopped instantaneously, while the power supply interrupting means 7 is inhibited from operation when the brake pedal 15 is depressed only slightly as in the case of the uphill starting of the motor vehicle.

More specifically, representing by $V_{brk1}$ a voltage value indicating a shallow depression (short stroke) of the brake pedal for the uphill start while representing by $V_{brk2}$ a voltage value indicative of a deep depression (long stroke) of the brake pedal in the emergency braking, the reference value $V_{ref}$ inputted to the comparator 51 is selected so that the following relation is satisfied:

$$V_{brk1} < V_{ref} < V_{brk2} \qquad (1)$$

Thus, for starting the motor vehicle on the way of an uphill, the throttle valve 12 can be controlled by the throttle actuator 6.

EMBODIMENT 2

In the case of the first embodiment of the invention, the brake depression magnitude detecting means 3 is designed to output a voltage which is proportional to the depression stroke of the brake pedal. In other words, the brake depression magnitude detecting means 3 is constituted by a brake pedal depression stroke sensor. However, instead of the brake depression stroke sensor, there can be employed to the substantially same effect a torque sensor designed to output a voltage corresponding to a torque applied to the brake pedal 15. In that case, the reference voltage value $V_{ref1}$ may be so selected that the power supply interrupting means 7 for the throttle actuator 6 is actuated only when a torque required for depressing deeply and rapidly the brake pedal is applied as in the case of emergency braking, while the power supply interrupting means 7 is maintained inoperative when a torque of small magnitude is applied to the brake pedal as in the case of the starting of the motor vehicle on an uphill road.

More specifically, representing by $V_{brk3}$ a torque of small magnitude applied to the brake pedal as in the case of the uphill starting while representing by $V_{brk4}$ a torque of large magnitude applied to the brake pedal as in the case of the emergency braking, the reference voltage $V_{ref1}$ inputted to the comparator 51 is so set that the following condition is satisfied:

$$V_{brk3} < V_{ref1} < V_{brk4} \qquad (2)$$

EMBODIMENT 3

In the case of the first and second embodiments of the invention, the power supply interrupting means 5 is activated in dependence on the logical product (AND) of the brake actuation signal outputted from the brake actuation detecting means 2 and the output signal of the comparator 51 which compares the signal outputted from the brake pedal depression magnitude detecting means 3 with the reference signal $V_{ref}$ in order to enhance the reliability of the control apparatus. According to the instant embodiment, the output signal of the brake pedal depression magnitude detecting means 3 is directly compared with the reference voltage value $V_{ref}$. With this arrangement, substantially same effect as those of the first and second embodiments can be obtained while sparing the AND circuit. The third embodiment provides the advantage that the running control apparatus can be simplified and implemented inexpensively.

EMBODIMENT 4

In the control apparatuses according to the first to third embodiments described above, the magnitude of the brake pedal depression is decided by using the electric/electronic circuits. In contrast, in the case of the control apparatus according to the fourth embodiment, the brake pedal depression magnitude detecting means 3, the power supply interrupt decision means 5 for the throttle actuator 6 and the power supply interrupting means 7 therefor are realized by an integral mechanical assembly.

Figure 4:
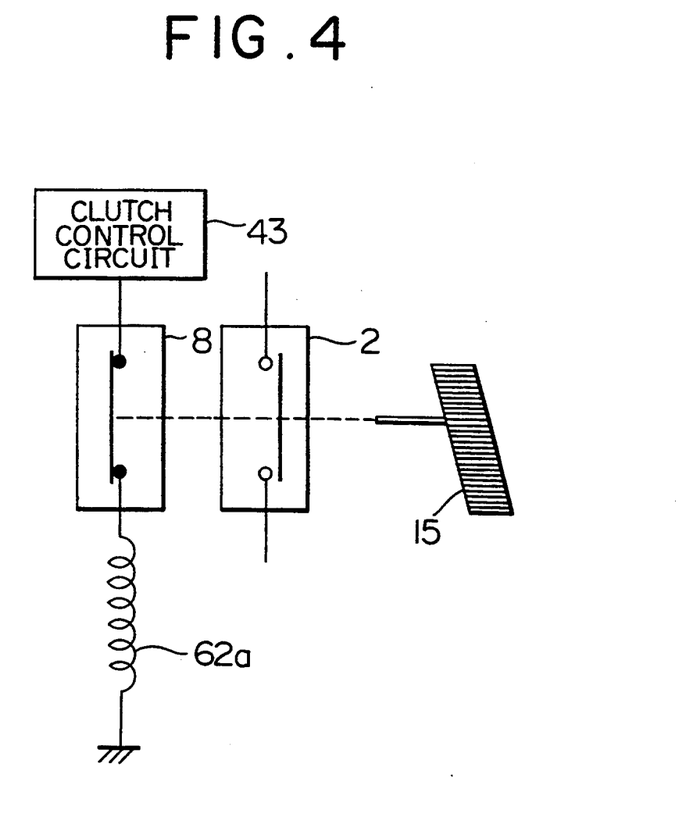
FIG. 4 is a schematic diagram showing another configuration of the power supply interrupting circuit according to another embodiment of the invention.
Figure 5:
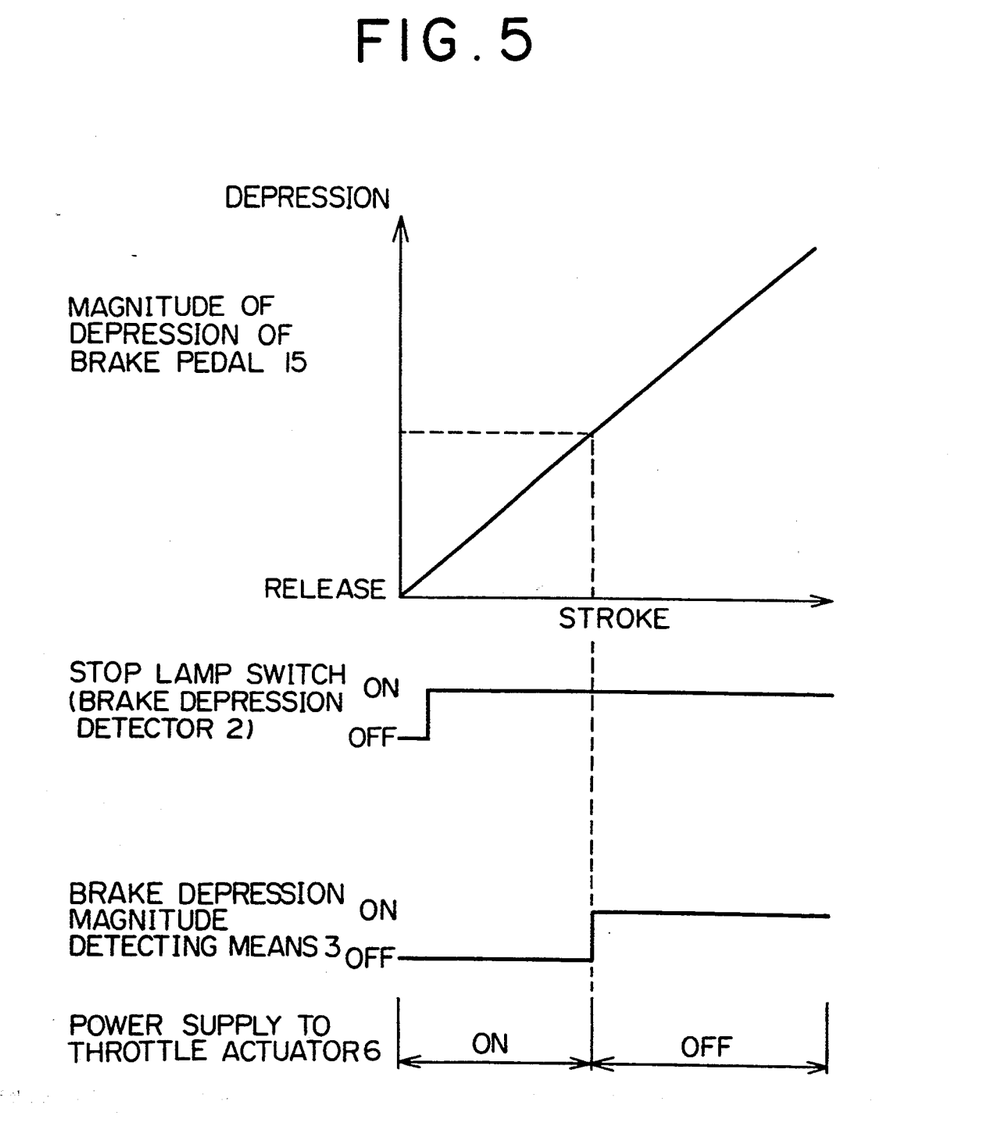
FIG. 5 is a timing chart for illustrating operation of the running control apparatus in which the power supply interrupting circuit shown in FIG. 4 is employed.

More specifically, FIG. 4 shows an arrangement according to the instant embodiment and FIG. 5 is a timing chart for illustrating operation thereof. In FIG. 4, reference numeral 2 denotes a stop lamp switch (brake actuation detecting means) and 8 denotes a brake pedal depression magnitude detecting switch, wherein the power supply interrupt decision means and the power supply interrupting means for the throttle actuator of FIG. 1 are implemented in an integral structure. Parenthetically, reference character 62a denotes a coil of the electromagnetic clutch 62 of the throttle actuator 6 and numeral 43 denotes the clutch control circuit.

As described previously, the stop lamp switch (constituting a brake actuation detecting means 2) provided in association with the brake pedal 15 is so implemented that it is closed when the brake pedal 15 is depressed only slightly by the driver, as is illustrated in FIG. 5. On the other hand, the brake pedal depression magnitude detecting switch 8 is adapted to operate in dependence on the magnitude of the brake depression stroke so that the contacts of the switch 8 are opened (OFF) when the brake pedal is depressed deeply, whereby the coil 62a of the electromagnetic clutch 62 is electrically deenergized independent of the output of the clutch control circuit 43 constituting a part of the throttle controller 4. Consequently, the electromagnetic clutch 62 is disconnected to thereby prevent the driving power of the driving mechanism 61 of the throttle actuator 6 from being transmitted to the throttle valve 12, which is then urged to assume the fully closed position under the influence of the return spring 11.

Usually, the state in which the accelerator pedal 14 is released indicates that the driver wants to decelerate the motor vehicle. Accordingly, when the brake pedal 15 is depressed in this state, the electromagnetic clutch 62 may be disconnected through the operation described above to thereby allow the throttle valve 12 to assume the fully closed position. In this connection, it is however noted that when the motor vehicle is to be started on an uphill or snow-covered road, it is required to open the throttle valve 12 by depressing the accelerator pedal while manipulating the braking system simultaneously. Accordingly, in the case of the instant embodiment, the brake pedal depression stroke detecting switch 8 is mechanically so adjusted that it is opened only when the brake pedal is deeply depressed while remaining in the closed state when the brake pedal is depressed slightly as required for starting the motor vehicle on the way of an uphill road. With the instant embodiment, substantially the same effect as described hereinbefore in conjunction with the first embodiment of the invention can be obtained.

EMBODIMENT 5

In the control apparatuses according to the first to fourth embodiments, the throttle actuator 6 includes the driving mechanism 61 implemented by a DC motor or a stepping motor and the electromagnetic clutch 62 of a friction disk type, wherein the electric power supply to the electromagnetic 62 is interrupted by the power supply interrupting means 7 in dependence on the magnitude of depression of the brake pedal 15. According to the instant embodiment of the invention, the driving mechanism 61 is constituted by a brushless DC motor or the like means which can neither generate the driving power nor hold the state as locked when the power supply is interrupted. In this case, the electromagnetic clutch 62 can be spared. As a further modification, a vacuum type throttle actuator operative under a negative pressure may be employed as the actuator 6. In that case, the power supply to the actuator control circuit 41 may be interrupted by the power supply interrupting means 7 with same effect.

Many features and advantages of the present invention are apparent from the detailed description and thus it is intended by the appended claims to cover all such features and advantages of the system which fall within the true spirit and scope of the invention. Further, numerous modifications and changes will readily occur to those skilled in the art.

By way of example, the running control apparatuses according to the illustrated embodiments are implemented by using analogue electronic/electric circuits. It should however be understood that the aimed object of the invention can equally be achieved softwarewise by using a microcomputer. Further, the logical relation between the outputs of the brake actuation detecting means 2 and the brake pedal depression magnitude detecting means 3 is never limited to the illustrated relation but is susceptible to various alterations. Additionally, although the power supply interrupting means 7 of the throttle actuator 6 is provided independent of the throttle control means 4 (implemented by a microcomputer) in order to ensure a high safety, the former may be incorporated in the latter. In that case, the structure of the running control apparatus can further be simplified.

Accordingly, it is not desired to limit the invention to the exact construction and operation illustrated and described. All suitable modifications and equivalents may be resorted to, falling within the scope of the invention.

I claim:

1. A running control apparatus for a motor vehicle driven by an internal combustion engine, comprising:

accelerator pedal actuation detecting means for detecting magnitude of actuation of an accelerator pedal;

brake pedal depression magnitude detecting means for detecting magnitude of depression of a brake pedal;

throttle control means for driving a throttle valve actuator by calculating a control quantity for controlling a throttle valve on the basis of an accelerator pedal actuation signal supplied from said accelerator pedal actuation detecting means; and power supply interrupting means for interrupting an electric power supply to said throttle valve actuator when the magnitude of brake pedal depression detected by said brake pedal depression magnitude detecting means exceeds a predetermined value, to thereby cause said throttle valve to assume a fully closed state, wherein said predetermined value is selected greater than a braking force applied in the state where said accelerator pedal is being actuated and smaller than a braking force applied in the state where said accelerator pedal is released.

2. A running control apparatus for a motor vehicle according to claim 1, further comprising:
   power supply interrupt decision means for deciding whether the magnitude of brake pedal depression detected by said brake pedal depression magnitude detecting means exceeds said predetermined value;
   wherein said power supply interrupt decision means includes a comparator for comparing an output signal of said brake pedal depression magnitude detecting means with a signal representing said predetermined value.

3. A running control apparatus for a motor vehicle according to claim 1, further comprising:
   power supply interrupt decision means for deciding whether the magnitude of brake pedal depression detected by said brake pedal depression magnitude detecting means exceeds said predetermined value; and
   brake actuation detecting means for detecting actuation of said brake pedal;
   wherein said power supply interrupt decision means includes:
   a comparator for comparing an output signal of said brake pedal depression magnitude detecting means with a signal representing said predetermined value; and
   an AND circuit for determining a logical product of an output signal of said brake actuation detecting means and an output signal of said comparator.

4. A running control apparatus for a motor vehicle according to claim 2,
   said power supply interrupting means including an electronic switching element through which an electric power is supplied to said throttle valve actuator,
   wherein an output signal of said comparator is applied to said switch element as a control signal for turning off said switching element when the magnitude of said brake pedal depression exceeds said predetermined value.

5. A running control apparatus for a motor vehicle according to claim 3,
   said power supply interrupting means including an electronic switching element through which an electric power is supplied to said throttle valve actuator,
   wherein an output signal of said AND circuit is applied to said switch element as a control signal for turning off said switching element when the magnitude of said brake pedal depression exceeds said predetermined value.

6. A running control apparatus for a motor vehicle according to claim 1,
   wherein said power supply interrupting means includes a mechanical switch through which an electric power is supplied to said throttle valve actuator, said switch being so implemented as to interrupt the power supply to said throttle valve actuator when the magnitude of said brake depression exceeds a predetermined value.

7. A running control apparatus for a motor vehicle according to claim 1,
   wherein said brake pedal depression magnitude detecting means is constituted by a stroke sensor for detecting a depression stroke of said brake pedal.

8. A running control apparatus for a motor vehicle according to claim 1,
   wherein said brake pedal depression magnitude detecting means is constituted by a torque sensor for detecting torque applied to said brake pedal for depression thereof.

9. A running control apparatus for a motor vehicle according to claim 1,
   said throttle valve actuator including driving means electrically controlled by said throttle control means and an electromagnetic clutch interposed between said driving means and said throttle valve,
   wherein electric power supply to said electromagnetic clutch is interrupted by said power supply interrupting means when the magnitude of said brake pedal depression exceeds said predetermined value.

10. A running control apparatus for a motor vehicle according to claim 1,
    said throttle valve actuator being constituted by a brushless DC motor electrically controlled by said throttle control means,
    wherein electric power supply to said brushless DC motor is interrupted by said power interrupting means when the magnitude of said brake pedal depression exceeds said predetermined value.

11. A running control apparatus for a motor vehicle according to claim 1,
    said throttle control means including fault detecting means for detecting occurrence of a fault in said running control apparatus;
    wherein said power supply interrupting means responds to a fault indicating output signal of said fault detecting means to thereby interrupt the electric power supply to said throttle valve actuator.

* * * * *